United States Patent
Lopez et al.

[19]

[11] Patent Number: 6,144,159
[45] Date of Patent: *Nov. 7, 2000

[54] APPARATUS FOR REGULATING THE ILLUMINATION FIELD OF A VEHICLE HEADLIGHT

[75] Inventors: Eladio Lopez, La Croix sur Lutry; Dominique Marchal, Vallorbe; Philippe Schweizer, Lonay, all of Switzerland

[73] Assignee: Robert Bosch GmbH, Stuttgart, Germany

[ * ] Notice: This patent is subject to a terminal disclaimer.

[21] Appl. No.: 09/020,009

[22] Filed: Feb. 6, 1998

[30] Foreign Application Priority Data

Feb. 6, 1997 [DE] Germany ............................ 197 04 427

[51] Int. Cl.[7] ........................................................ B60Q 1/06
[52] U.S. Cl. ................................................ 315/82; 362/71
[58] Field of Search ................................ 315/82, 76, 77; 362/66, 71

[56] References Cited

U.S. PATENT DOCUMENTS

| | | | |
|---|---|---|---|
| 4,620,267 | 10/1986 | Cibie | 362/71 |
| 4,679,935 | 7/1987 | Fukuda et al. | 356/121 |
| 5,193,894 | 3/1993 | Lietar et al. | 362/66 |
| 5,633,710 | 5/1997 | Kumra et al. | 356/139.08 |

FOREIGN PATENT DOCUMENTS

| | | |
|---|---|---|
| 0 186 571 | 7/1986 | European Pat. Off. . |
| 0 505 237 | 9/1992 | European Pat. Off. . |
| 43 41 409 | 6/1995 | Germany . |
| 43 41 409 A1 | 6/1995 | Germany . |

*Primary Examiner*—David Vu
*Attorney, Agent, or Firm*—Michael J. Striker

[57] ABSTRACT

A headlight illumination field regulating apparatus includes an electromagnetic radiation emitter, a reflected radiation sensor, an evaluation unit, and a unit for adjusting the alignment position of the headlights. The electromagnetic radiation emitter operates to radiate electromagnetic radiation on the road to the front of the automobile and the reflected radiation sensor senses reflected radiation and creates a data point representative of the irradiated spot. The evaluation unit evaluates the data points to establish the position of the detected spot or area and thereafter compares the evaluated position with a predetermined desired position and subsequently generate a correction signal to control the regulation or adjustment of the headlights into a proper light projecting orientation which ensures a proper projection limit of the beam of the headlight.

12 Claims, 6 Drawing Sheets

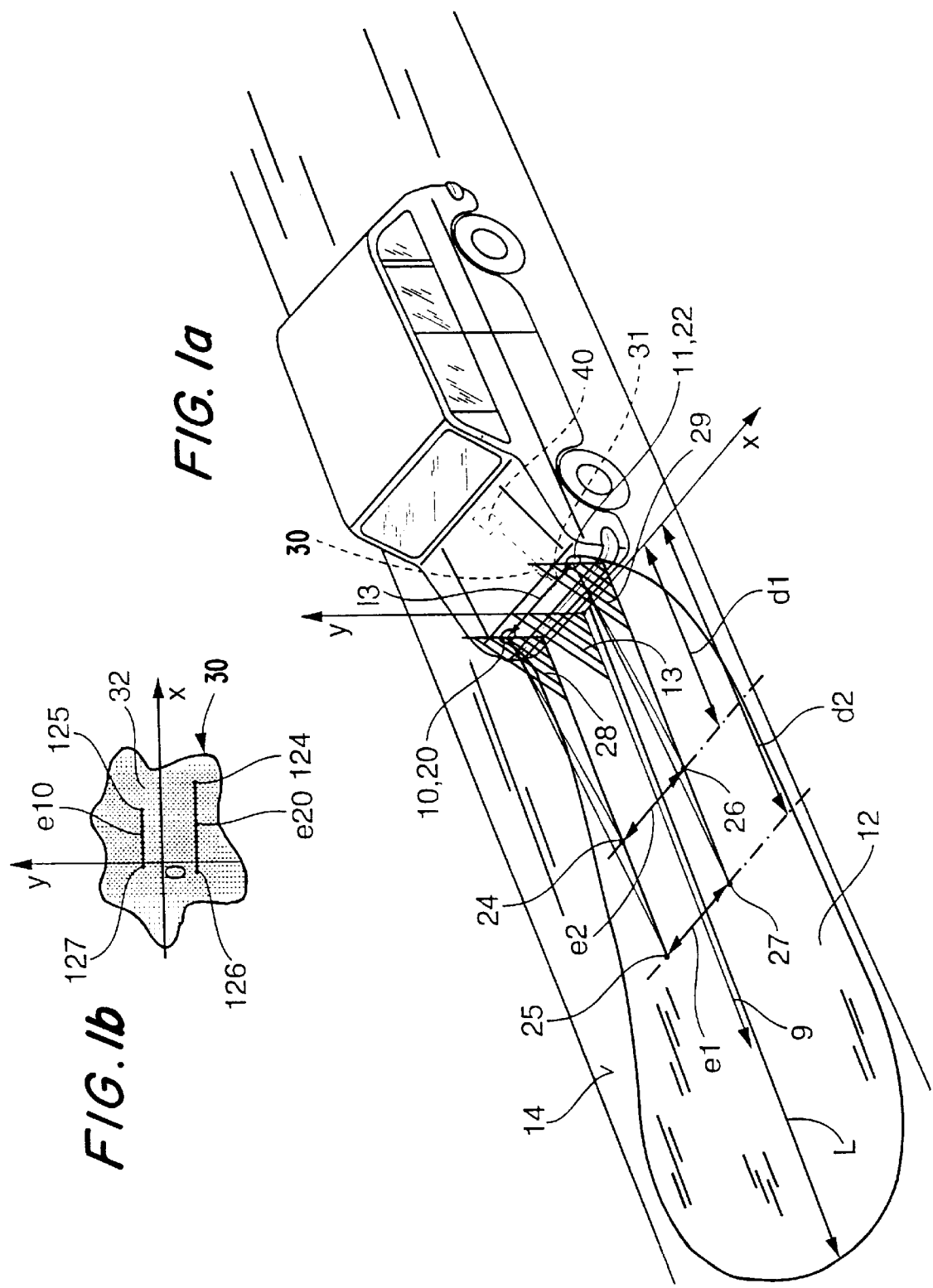

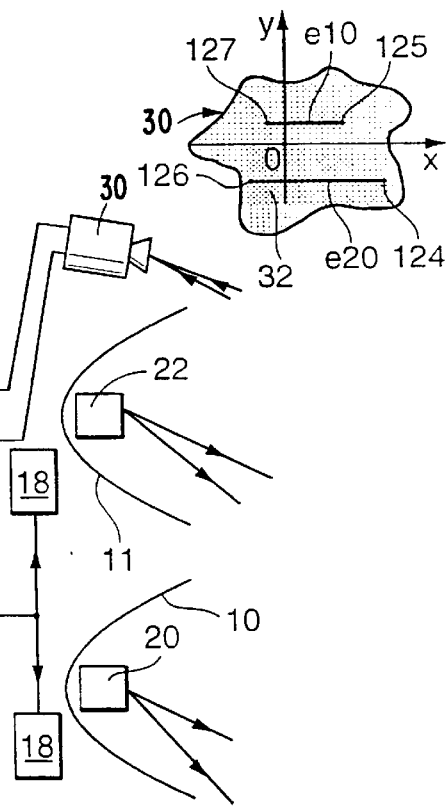
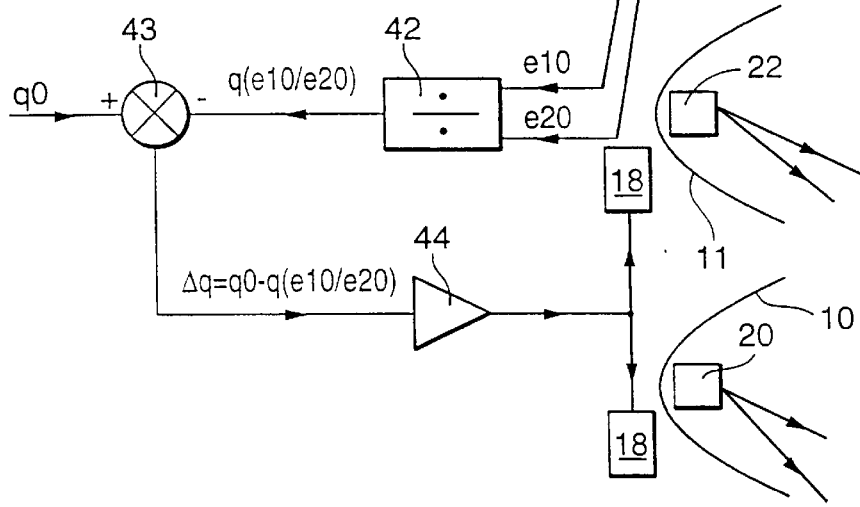
FIG. 2a
FIG. 2b
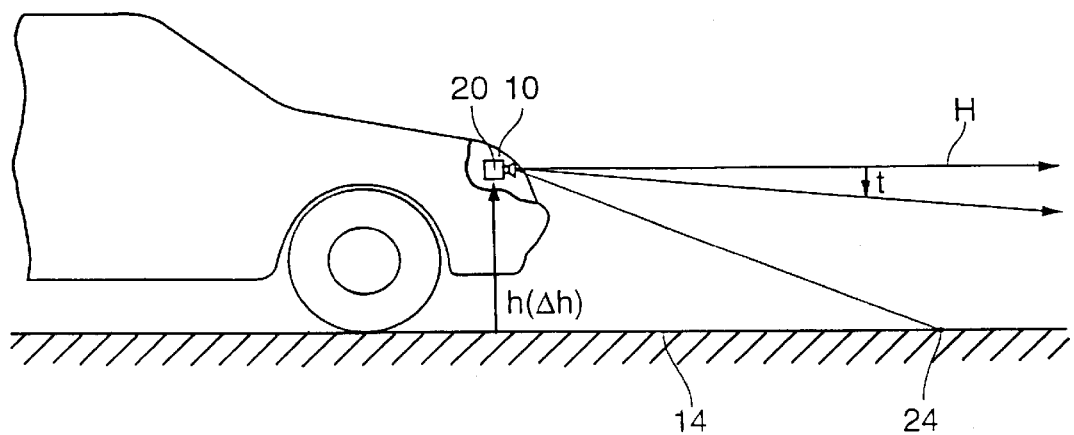
FIG. 3

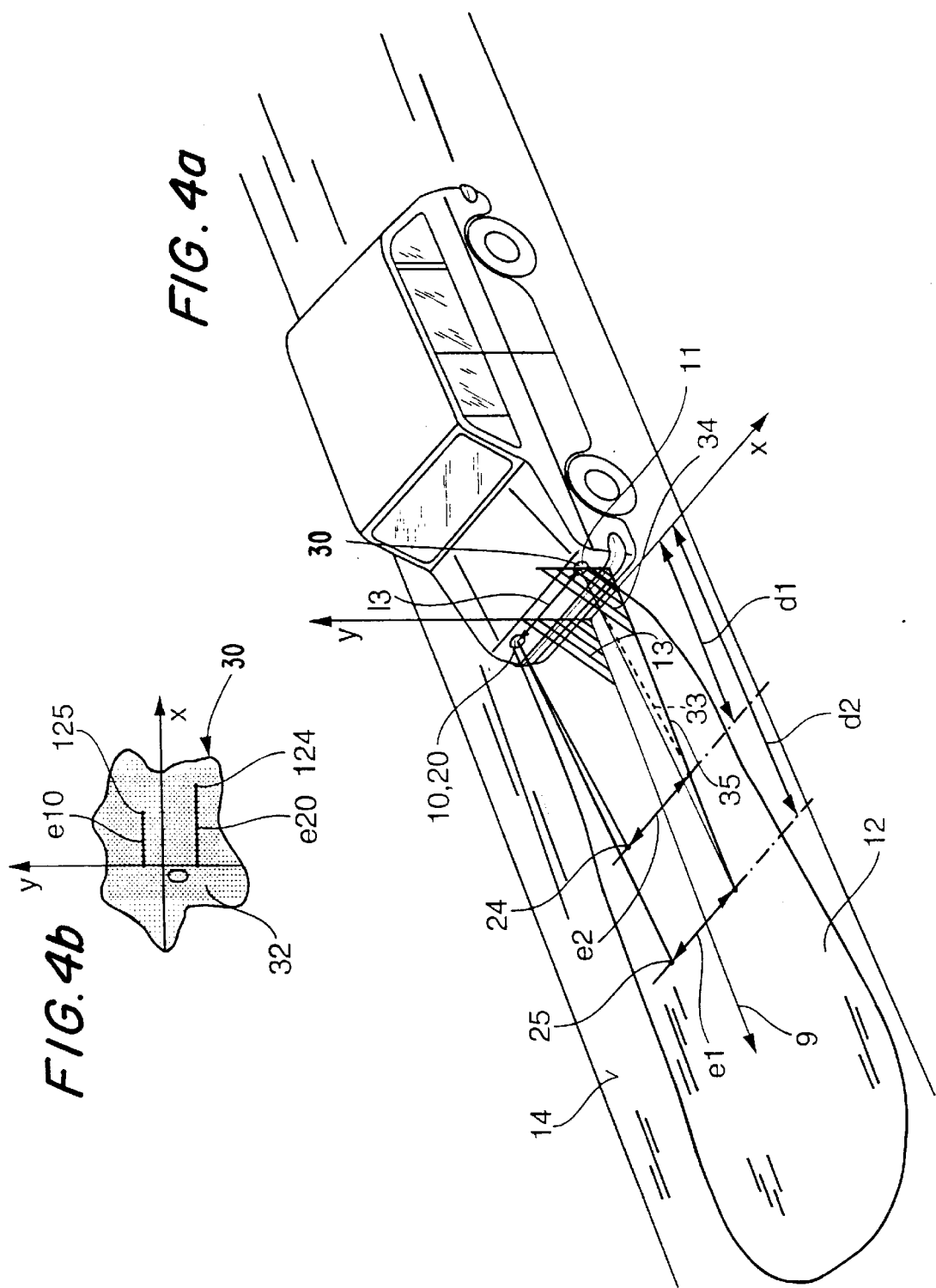

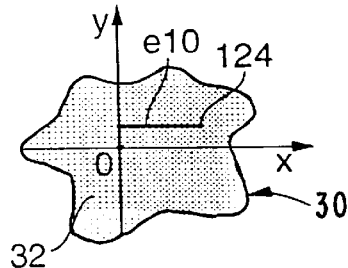
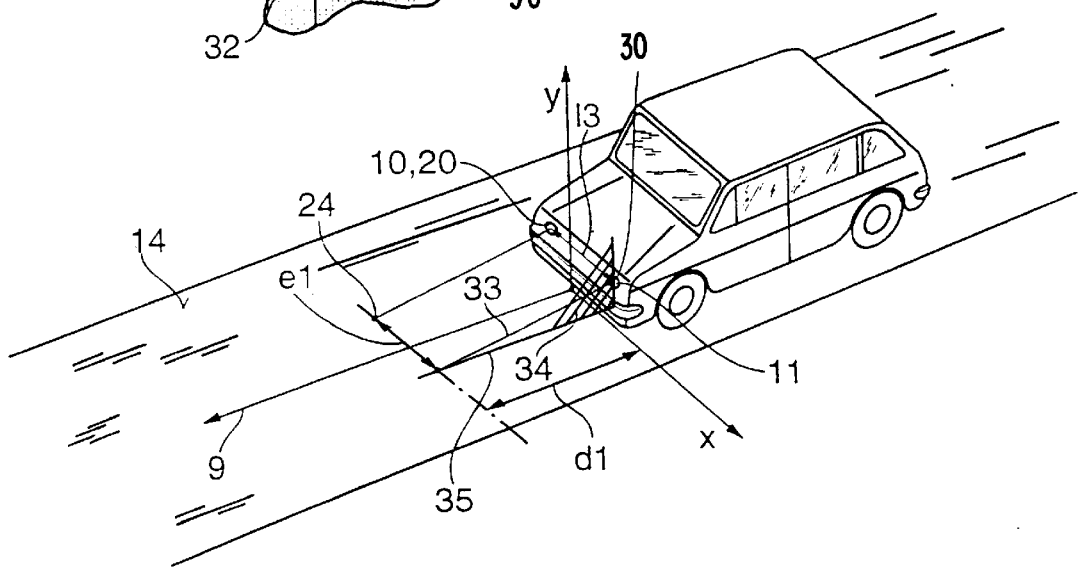
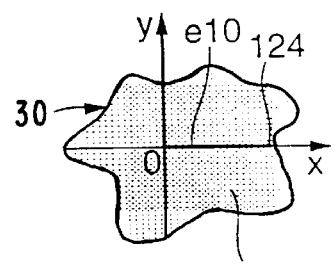
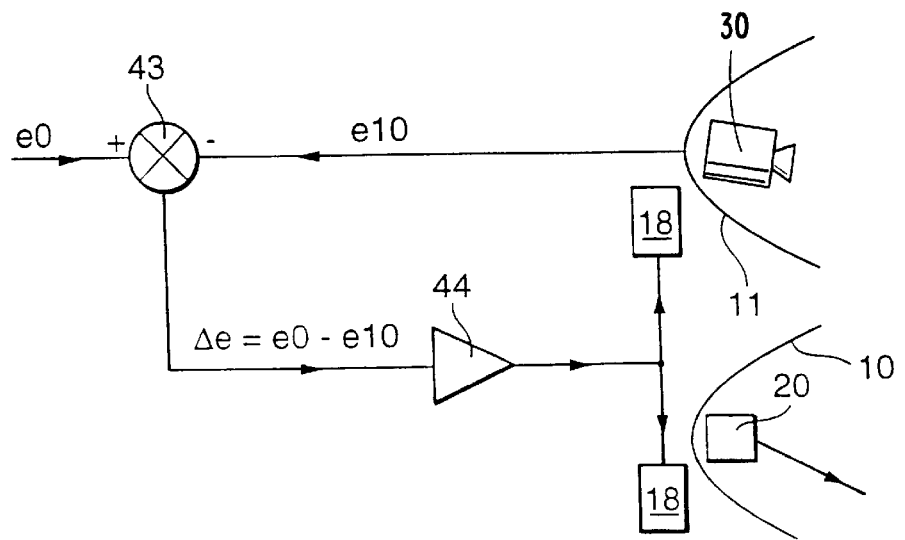

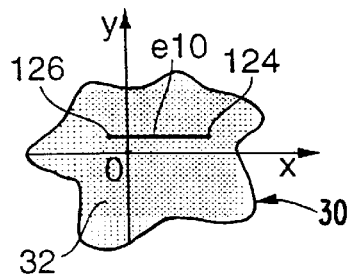
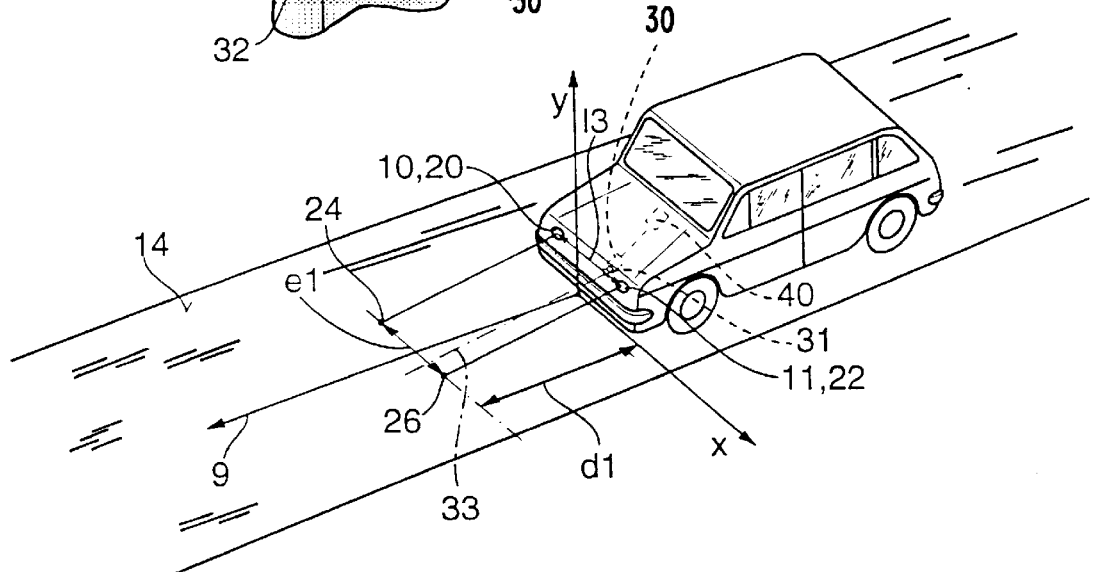
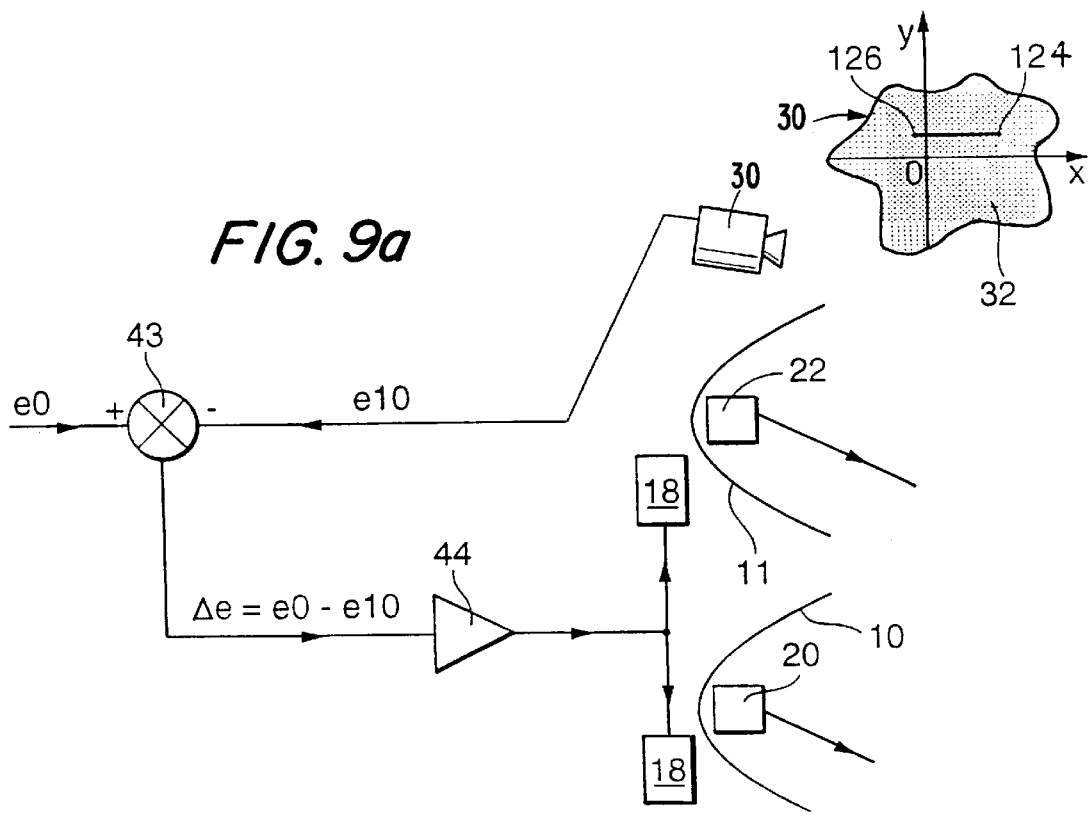

APPARATUS FOR REGULATING THE ILLUMINATION FIELD OF A VEHICLE HEADLIGHT

The present invention relates to an apparatus for regulating the illumination field of a vehicle headlight.

BACKGROUND OF THE INVENTION

German patent document DE 43 41 409 Al discloses a headlight illumination field regulating apparatus having an electromagnetic radiation emitter, a reflected radiation sensor, an evaluation unit, and a unit for adjusting the alignment position of the headlights. The electromagnetic radiation emitter operates to radiate electromagnetic radiation on the road to the front of the automobile and the reflected radiation sensor senses reflected radiation and creates a data point representative of the irradiated spot.

The evaluation unit evaluates the data points to establish the position of the detected spot or area and thereafter compares the evaluated position with a predetermined desired position and subsequently generate a correction signal to control the regulation or adjustment of the headlights into a proper light projecting orientation which ensures a proper projection limit of the beam of the headlight.

In the event that the inclination of the vehicle in the fore and aft direction-namely, relative to its direction of travel—changes, this disclosed regulating apparatus can accommodate such inclinations and control the orientation of the headlights to maintain the proper projection limit of their beams. However, imprecision in the regulation of the headlights can arise from the circumstance that the projection limit of the headlight beam is influenced by changes in the height of the vehicle as well as by changes in its inclination. This imprecision is magnified the smaller the projection limits of the headlight beam.

SUMMARY OF THE INVENTION

The present invention provides a headlight illumination field regulating apparatus which accommodates changes in the height of the vehicle as well as by changes in its inclination. According to one aspect of the present invention, there is provided an apparatus for regulating the illumination field of a running light of a vehicle, the running light being of the type for illuminating a region forward of the vehicle relative to the vehicle's direction of travel and the vehicle being of the type having an adjusting element for adjusting the orientation of the running light to thereby vary the position of the illumination field relative to the vehicle. The apparatus includes a member for irradiating an area on the road surface with a radiation beam in a manner in which at least some of the radiation beam is reflected. The apparatus also includes a sensor for sensing a characteristic of radiation reflected from the irradiated area on the road surface.

The apparatus further includes a member for comparing a sensed reflected radiation characteristic with a radiation characteristic representative of a predetermined position of the illumination field of the running light. The comparing member is operatively connected with the adjusting element for providing a signal thereto in response to which the adjusting element can adjust the orientation of the running light on the vehicle and thereby reorient the running light into a position in which its illumination field is as desired. Also, the comparing member includes means for creating a data point which is representative of the sensed reflected radiation characteristic and means for evaluating a characteristic of the data point with respect to a reference data point to determine the signal provided to the adjusting element and the reference data point is representative of the position of the sensor.

BRIEF DESCRIPTION OF THE DRAWINGS

FIG. 1 is a perspective view of a vehicle having one embodiment of the headlight illumination field regulating apparatus of the present invention and schematically showing a coordinate reference system to facilitate an understanding of the apparatus and its operation;

FIG. 2 is a simplified schematic view of a data processing unit of the apparatus shown in Figure and showing, in a Cartesian reference grid graphic, the output of the data processing unit;

FIG. 3 is a side elevational view of a front portion of the vehicle shown in FIG. 1 and showing, in partial vertical section, a signal sending unit of the apparatus and a headlight to which the apparatus is operatively connected;

FIG. 4 is a perspective view of a vehicle having another embodiment of the headlight illumination field regulating apparatus of the present invention and schematically showing a coordinate reference system to facilitate an understanding of the apparatus and its operation;

FIG. 6 is a perspective view of a vehicle having a further embodiment of the headlight illumination field regulating apparatus of the present invention and schematically showing a coordinate reference system to facilitate an understanding of the apparatus and its operation;

FIG. 7 is a simplified schematic view of a data processing unit of the apparatus shown in FIG. 6 and showing, in a Cartesian reference grid graphic, the output of the data processing unit;

FIG. 8 is a perspective view of a vehicle having an additional embodiment of the headlight illumination field regulating apparatus of the present invention and schematically showing a coordinate reference system to facilitate an understanding of the apparatus and its operation; and FIG. 9 is a simplified schematic view of a data processing unit of the apparatus shown in FIG. 8 and showing, in a cartesian reference grid graphic, the output of the data processing unit.

DESCRIPTION OF PREFERRED EMBODIMENTS

Figure 5B:
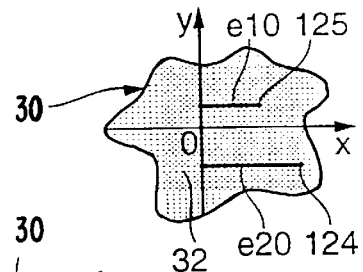
FIG. 5 is a simplified schematic view of a data processing unit of the apparatus shown in FIG. 4 and showing, in a cartesian reference grid graphic, the output of the data processing unit.

As seen in FIG. 1, a vehicle schematically represented as an automobile is traveling on a road surface road 14 and the automobile has a pair of headlights 10, 11 on its front end for illuminating a illumination field frontward of the automobile. The headlights 10, 11 can be of the type for producing a blended light exclusively or, alternatively, of the type for producing both a blended light and a far distance illuminating beam. As another alternative, the headlight 10, 11 can be of the type for producing light beams of the type considered suitable for fog conditions.

In the event that the headlights 10, 11 are of the type for producing a blended light beam, a light beam 12 is projected by each headlight 10, 11 capable of illuminating a region frontward of the automobile including at least the road 14. The light beam 12 is shown in FIG. 1 schematically by several lines indicating a light beam having equal intensity across its area of projection. To prevent a blinding of a person in an oncoming vehicle, the light beams 12 each have an upper bright-dark border which acts to limit the forward-most distance of projection of the light beam 12 to a predetermined spacing or projection limit L from the automobile. The L represents thus the projection limit of the headlights 10, 11. In the event of changing load characteristics of the automobile or in the event of road and travel related conditions such as, for example, braking and accelerating of the automobile or unevenness of the road surface, corresponding changes in the tilt or inclination of the automobile in a front and rear manner produce corresponding changes in the projection limit of the headlights 10, 11 and the position of the bright-dark border changes. As a result, either the frontward illuminated area frontward of the automobile is not sufficiently illuminated, if the projection limit is too small, or a blinding an oncoming driver can occur, if the projection limit is too large. In accordance with the present invention, an illumination field regulating apparatus is provided to maintain the projection limit L at a constant value independent of the tilt or inclination characteristic of the vehicle. The headlight illumination field regulating apparatus can be operatively coupled to the assembly which controls the operation of the headlights 10, 11 so that the headlight illumination field regulating apparatus is operated in conjunction with the operation of the headlights 10, 11 or, alternatively, the headlight illumination field regulating apparatus can be continuously operated during vehicle operation. The headlight illumination field regulating apparatus includes an electromagnetic radiation emitter, a reflected radiation sensor, an evaluation unit, and a unit for adjusting the alignment position of the headlights 10, 11 in response to information evaluated by the headlight illumination field regulating apparatus. The electromagnetic radiation emitter operates to radiate electromagnetic radiation on the road 14 to the front of the automobile during operation of the headlight illumination field regulating apparatus whereby the radiation can be comprised of visible light and another type or frequency of light such as, for example, infrared or ultraviolet light. The radiation beam is focused to the extent possible so that only a relatively small area on the road 14 to the front of the automobile such as, for example, a spot, is irradiated. The radiation contacting the irradiated spot is to some degree reflected from the road 14 and the reflected radiation sensor senses this reflected radiation and stores or otherwise creates a data point representative of the irradiated spot or area from which the detected, back reflected radiation has been sensed. The evaluation unit can thus evaluate the data points so created by the reflected radiation sensor to establish the position of the detected spot or area and can thereafter compare the evaluated position with a predetermined desired position and subsequently generate a correction signal to control the regulation or adjustment of the headlights 10, 11 into a proper light projecting orientation which ensures a proper projection limit L.

FIGS. 1–3 illustrate one embodiment of the headlight illumination field regulating apparatus of the present invention. The electromagnetic radiation emitter of the headlight illumination field regulating apparatus includes two spaced apart radiation senders 20, 22 which are disposed on the front end of the automobile in spaced apart relationship to one another relative to a transverse of a vertical longitudinal plane 13 of the automobile. The radiation emitters 20, 22 each are disposed at a spacing e3 from the vertical longitudinal plane 13 as measured perpendicularly thereto. It can be provided that at least one or both of the radiation emitters 20, 22 are integrated into the headlights 10, 11. Alternatively, it can be provided that at least one or both of the radiation emitters 20, 22 are arranged at a spacing from the headlights 10, 11. Preferably, the radiation emitters 20, 22 are disposed adjacent the side edges of the automobile so that the maximum spacing e3 can be achieved and integration of the radiation emitters 20, 22 into the headlights 10, 11 is feasible. Each of the radiation emitters 20, 22 sends out or radiates two focused radiation beams. The radiation beam pairs of each radiation emitters 20, 22 act to irradiate two spots or areas to be sensed on the road 14, the two spots or areas each being at a different distance or spacing from the automobile as measured relative the direction of travel 9 of the automobile parallel to the vertical longitudinal plane 13. The radiation emitter 20, which is on the right side of the automobile as viewed in the direction of travel 9, acts to irradiate a spot 24 at a spacing d1 from the front of the automobile and a spot 25 at a spacing d2 from the front of the automobile. The radiation emitter 22, which is on the left side of the automobile as viewed in the direction of travel 9, acts to irradiate a spot 26 at a spacing d1 from the front of the automobile and a spot 27 at a spacing d2 from the front of the automobile. The spots 24, 26 are preferably at generally the same spacing d1 from the automobile while the spots 25, 27 are preferably at generally the same spacing d2 from the automobile.

The radiation beams sent out by the radiation emitter 20 travel in a common vertical plane vertical plane 28 while the radiation beams sent out by the radiation emitter 22 travel in a common vertical plane 29. The vertical plane vertical planes 28, 29 can be arranged parallel to one another, arranged to converge toward one another in the direction of travel 9, or arranged to diverge from one another in the direction of travel 9. In the disposition of the headlight illumination field regulating apparatus shown in FIG. 1, the vertical plane vertical planes 28, 29 are disposed parallel to one another. The spots 24, 26 are located on the road 14 each at a spacing e2 from the vertical longitudinal plane 13 as measured perpendicularly thereto. The spots 25, 27 are located on the road 14 each at a spacing e1 from the vertical longitudinal plane 13 as measured perpendicularly thereto. Due the parallel arrangement of the vertical plane vertical planes 28, 29, in which the radiation beams travel, the spacings spacing e1 and e2 are of generally the same magnitude and, in any event, are at least the same approximate magnitude as the spacing e3 of the individual radiation emitters 20, 22 on the automobile. The sensor assembly 30 of the headlight illumination field regulating apparatus is disposed between the two radiation emitters 20, 22 on the front of the automobile. The sensor assembly 30 is oriented toward the road 14 at the front of the automobile and includes a data point creation optic guide 31 and a plurality of plotters 32 for plotting graphically or in another manner the reflected radiation from the irradiated spots on the road 14. The optic guide 31 is operable to guide the reflected radiation to the plotters 32 so that the plotters 32 can then create data points representative of the spots 24–27. In FIGS. 1 and 2, an arrangement of the plotters 32 is shown in which the plotters 32 are arranged in a matrix. The sensor assembly 30 is, for example, in the form of a camera, especially a video camera, and the plotters 32 can be in the form of a so-called CCD-matrix or Charge-Coupled-Device matrix. Alternatively, the plotters 32 can be in the form of photocells or photo diodes. Instead of a matrix arrangement, the plotters 32 can be linearly arranged.

In the one embodiment of the headlight illumination field regulating apparatus as shown in FIG. 1, the spots 24, 27 are detected by the optic guide 31 and data points representative thereof are created by the plotters 32. The optical axis 33 of the sensor assembly 30 extends thus in a plane 34 which is at least generally parallel to the vertical planes 28, 29. The spot 24 is represented as a data point in graphic form in the sensor assembly 30 as a plotted point graphic data point 124, the spot 25 is represented as a data point in graphic form in the sensor assembly 30 as a plotted point 125, the spot 26 is represented as a data point in graphic form in the sensor assembly 30 as a plotted point data point 126, and the spot 27 is represented as a data point in graphic form in the sensor assembly 30 as a plotted data point 127. The matrix of the plotters 32 is comprised of a vertical axis Y and a horizontal axis X. The vertical axis Y represents thus the vertical axis of the automobile which lies in the vertical longitudinal plane 13 and the horizontal axis X represents a horizontal axis of the automobile which is perpendicular to the vertical longitudinal plane 13. A spacing e20 extends between the graphic data point 124 and the data point 126 which represent respectively the spots 24, 26 and the spacing e20 is representative of the spacing e2 of the spot spots 24, 25 on the road 14.

A spacing e10 extends between the data points 125, 127 which represent respectively the spots 25, 27 and spacing e10 is representative of the spacing e1 of the spots 25, 27 on the road 14. The spacing e10 and spacing e20 are parallel to an axis OX and are measured along that direction. If desired, the data point 126 can act as a reference position for the graphic data point 124, which lies at the spacing e20 from this reference position. Conversely, the graphic data point 124 can act as a reference position for the data point 126, which lies at the spacing e20 from this reference position. In the same manner, the data point 127 can act as a reference position for the data point 125, which lies at the spacing e10 from this reference position. Conversely, the data point 125 can act as a reference position for the data point 127, which lies at the spacing e10 from this reference position.

As seen in FIG. 2, the headlight illumination field regulating apparatus is shown in a simplified schematic manner. The evaluation unit is designated as the evaluation unit 40. The radiation emitters 20, 22 are disposed in the headlights 10, 11 and the sensor assembly 30 is disposed intermediate the radiation emitters 20, 22. The evaluation unit 40 is operatively connected to the sensor assembly 30 whereby the signal transceiver element 42 of the evaluation unit 40 is provided with signals comprising information about the spacing e10 and the spacing e20. The signal transceiver element 42 receives a signal from the sensor assembly 30 concerning the relationship between the spacing e10 and the spacing e20, for example, in the form of a ratio q(spacing e10/spacing e20) which is the ratio of the magnitude of spacing e10 to the magnitude of spacing e20. The signal transceiver element 42 in turn transmits a signal representative of the ratio q to a comparator 43 which itself stores a predetermined desired ratio qO or is provided with this desired ratio data from the signal transceiver element 42. The comparator 43 compares the instantaneous ratio q with the ratio qO (spacing e10/spacing e20) and determines a difference q. The determined q is sent as an output of the comparator 43 to a control element 44 and the headlight adjustment control element 44, if the q is not zero, controls the headlight position adjuster 18 to accordingly adjust the orientation of the headlights 10, 11.

The ratio qO (spacing e10/spacing e20) applied by the comparator 43 is a ratio of the spacing e10 and the spacing e20 in a correct adjustment position of the projection limit L of the headlight 10. In the event that the spacing e1 and e2 of the spots 24–27 on the road 14 are represented as the spacing e10 and spacing e20 in the sensor assembly 30 and the ratio q (spacing e10/spacing e20) transmitted by the signal transceiver element 42 to the comparator 43 is the same as qO, the q in this event is zero and no adjustment of the headlights 10, 11 need be undertaken by the headlight position adjuster 18. However, in the event that a change in the inclination of the automobile causes the actual position of the projection limit L to vary from its correct position, the spots 24–27 on the road 14 assume different positions on the road 14 than the spacing d1 and spacing d2 of the correct position of the projection limit L. In this event, the spots 24–27 are represented differently in the sensor assembly 30 than they are represented in a correct positioning of the projection limit L and, correspondingly, the graphic data point 124 and graphic data point 127 of the spots 24–27 in the sensor assembly 30 assume different positions as well and correspondingly different spacing e10 and spacing e20 are produced. The signal transceiver element 42 in this event creates a signal for the ratio q (spacing e10/spacing e20) and a signal is created in the comparator 43 representing the q which in this instance is a value other than zero. In dependence on this signal created by the comparator 43, the headlight adjustment control element 44 responds to control the headlight position adjuster 18 to so adjust the headlights 10, 11 until the q achieves a value of zero. In this event, the radiation emitters 20, 22 and, preferably, the sensor assembly 30 also, are synchronously adjusted with the adjustment of the headlights 10, 11 and this can be accomplished by an additional adjustment element or by the integration of the radiation emitters 20, 22 into the headlights 10, 11 whose adjustment is controlled by the headlight position adjuster 18. The precision of the headlight illumination field regulating apparatus is dependent among other things on the magnitude of the ratio q (spacing e10/spacing e20). It can be provided, for example, that qO is at a value of 0.5 in the correct position of the projection limit L whereby the spacing e20 is approximately double the value of the spacing e10 and correspondingly the spacing d2 of the spots 25, 27 is approximately double the value of the spacing d1 of the spots 24, 26. The spacing d1 and spacing d2 can amount to between several meters up to about 40 meters. For example, the spacing d1 can range between about 2 meters and 5 meters and the spacing d2 can range between 4 meters and about 10 meters.

As seen in FIG. 3, the front end of the automobile is shown in a simplified schematic view with a partial vertical sectional view to permit the headlight 10 and the radiation emitter 20 to be viewed. In the event of a change in the inclination of the automobile, an inclination angle t with respect to a horizontal axis H is created and, as well, a change h in the height h of the installed position of the headlight 10 and the radiation emitter 20 on the automobile is created. The h effects a change in the representative positions of the spots 24–27 in the sensor assembly 30 although it is desired that this change not influence the projection limit L. Different spacing e10 and spacing e20 of the graphic data point 124 and graphic data point 127 are created in dependence on the existence and magnitude of the h. However, the creation of the ratio q (spacing e10/spacing e20) of the spacing e10 and the spacing e20 eliminates the undesired influence of the h so that the ratio q (spacing e10/spacing e20) is only dependent upon the change in the inclination angle t.

Figure 5A:
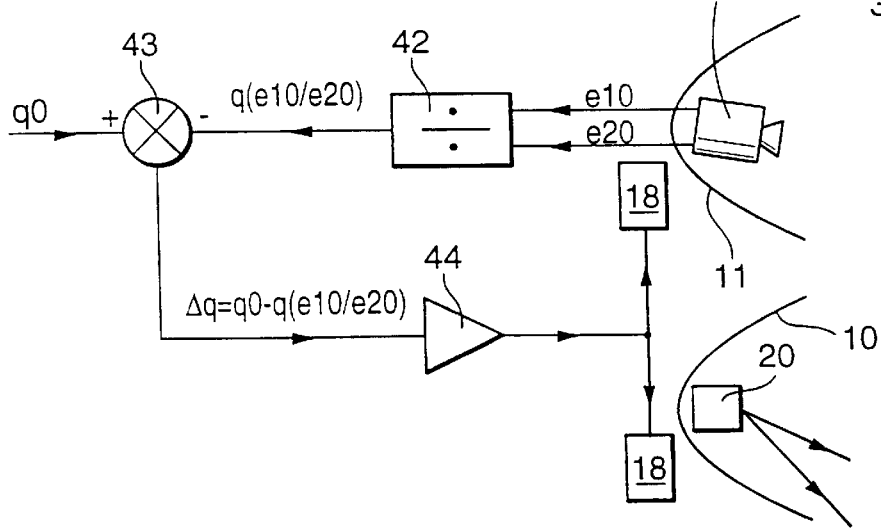

In FIG. 4, an automobile is shown having another embodiment of the headlight illumination field regulating apparatus of the present invention. The same or similar components of the headlight illumination field regulating apparatus are provided on this embodiment as have been described with respect to the one embodiment shown in FIG. 1 with several variations. Namely, the headlight illumination field regulating apparatus shown in FIG. 4 has only a single radiation emitter 20 which can be mounted, for example, in the headlight 10 which is on the right side of the automobile as viewed in the direction of travel 9. The radiation emitter 20 radiates two radiation beams which irradiate the spot 24 and 25 on the road 14. The sensor assembly 30 is installed in the headlight 11 on the left side of the automobile as viewed in the direction of travel 9 and the optical axis 33 of the sensor assembly 30 is in a plane 34 extending parallel to the vertical longitudinal plane 13 and parallel to the vertical plane 28 in which the radiation beams radiated by the radiation emitter 20 travel. The spot 24 is at a spacing d1 from the automobile and the spot 25 is at a spacing d2. As shown in FIGS. 4 and 5, the spot 24 is represented in the sensor assembly 30 as the graphic data point 124 and the spot 25 is represented as the data point 125.

If an additional electromagnetic radiation emitter were to be installed in the headlight 11, the representative graphic data point 124 and 125 of the spots irradiated by this additional electromagnetic radiation emitter would be created in the sensor assembly 30 and these graphic data point 124 and 125 would assume different positions along the vertical axis OY of the matrix of the 32 in correspondence with the respective spacings of the represented irradiated spots from the automobile. However, these graphic data point 124 and 125 would always maintain the same distance from the vertical axis OY as viewed with respect to the axis OX. The spots can be arranged to lie on the vertical axis OY by undertaking corresponding disposition of the sensor assembly 30 such that its optical axis 33 lies in the plane in which the radiation beams of the additional electromagnetic radiation emitter travel. For this reason, the need for an additional electromagnetic radiation emitter in the headlight 11 can be eliminated as, instead, as seen in FIG. 5, the graphic data point 124 and 125 representing the respective spacing e10 and spacing e20 of the spot 24 and 25 need only be evaluated with respect to the vertical axis OY in the direction of the horizontal axis OX. The spacing e10 and spacing e20 are thus representative of the spacing e1 and e2 of the spot 24 and 25 on the road 14 from the intersecting line 35 representing the trace of the optical axis 33 of the sensor assembly 30 on the road 14. The vertical axis OY thus forms a virtual reference position for the graphic data point 124 and 125 which have the spacing e20 and spacing e10, respectively, from this reference position. The reference position in the form of the vertical axis OY for the graphic data point 124 and 125 is thus predetermined in the sensor assembly 30. In dependence upon the spacing d1 and spacing d2, the spot 24 and 25 are represented in the sensor assembly 30 in differing positions and the spacing e20 and spacing e10 corresponding to these differing positions can be evaluated with respect to the vertical axis OY as measured along the horizontal axis OX in the matrix of the 32. The signal transceiver element 42 of the evaluation unit 40, as seen in FIG. 5, receives signals concerning the spacing e10 and spacing e20 and a signal for the ratio q (spacing e10/spacing e20) is created and transmitted to the comparator 43. The comparator 43 compares the desired qO with the instantaneous q and transmits a signal to the headlight adjustment control element 44 which, in turn, controls the headlight position adjuster 18 to adjust the headlights 10, 11 in the q is not zero. The radiation emitter 20 and the sensor assembly 30 are preferably adjusted by this same sequence.

The another embodiment of the headlight illumination field regulating apparatus shown in FIG. 4 provides the ratio q (spacing e10/spacing e20); however, no information is provided concerning the adjustment of the headlight 11 in which the sensor assembly 30 is mounted. It can be assumed that the headlight 10 in which is mounted the radiation emitter 20 and the headlight 11 in which the sensor assembly 30 is mounted are so adjusted that the headlights 10, 11 project their light beams to the correct projection limit L. However, during the life of the automobile, the headlight 11 may take on a different inclination than the headlight 10. In this event, the graphic data point 124 and 125 in the sensor assembly 30 have different positions in the vertical direction-that is, in the direction of vertical axis OY. The inclination angle change of the headlight 11 with respect to the headlight 10 is relatively small and can be approximated by the equation:

$$=(Py(x)DY)f$$

in which Py is the extension of an element 32 of the sensor assembly 30 in the direction of vertical axis OY, DY is the change in the position of the graphic data point 124, 125 in the direction of vertical axis OY and f is the illumination width of the optic guide 31 of the sensor assembly 30. A change in the inclination angle in the sense that the headlight 11 is tilted relatively more severely downward results in the graphic data point 124, 125 being plotted relatively higher in the direction of vertical axis OY, whereby the position shift or change DY is a negative value. Conversely, a change in the inclination angle in the sense that the headlight 11 is tilted relatively less severely downward results in the graphic data point 124, 125 being plotted relatively lower in the direction of vertical axis OY, whereby the change DY is a positive value. The evaluation unit 40 is operable to transmit a signal concerning the change DY, whereby either continuously or intermittently a synchronization of the adjusting of the inclination of the two headlights 10, 11 can be undertaken, with the value of the change DY being taken into account and the headlight position adjuster 18 of the headlight 11 so adjusting the position of the headlight 11 to reduce the value of the change DY to zero.

In FIG. 6, an automobile is shown having a further embodiment of the headlight illumination field regulating apparatus of the present invention. The same or similar components of the headlight illumination field regulating apparatus are provided on this embodiment as have been described with respect to the one embodiment shown in FIG. 1 with several variations. Namely, the headlight illumination field regulating apparatus shown in FIG. 6 includes two radiation emitters 20, 22 each of which is mounted near or integrated into a respective one of the headlights 10, 11. A sensor assembly 30 is disposed intermediate the radiation emitters 20, 22. A spot radiation beam is radiated from the radiation emitter 20 in the direction of travel 9 and this radiation beam irradiates a 24 on the road 14 at a spacing d1 from the automobile. A spot radiation beam is radiated from the radiation emitter 22 in the direction of travel 9 and this radiation beam irradiates a 26 on the road 14 at a spacing d1. The spots 24, 26 are spaced from one another on the road 14 by a spacing e1.

The spot spots 24, 25 are represented in the sensor assembly 30 as seen in FIGS. 5 and 6 as the data point 125125, respectively, which are created by the optic guide 31. A spacing e10 extends between the data points 125, 127 which represent respectively the spots 25, 27 and spacing e10 is representative of the spacing e1 of the spots 25, 27 on the road 14. The spacing e10 and spacing e20 are parallel to an axis OX and are measured along that direction. If desired, the data point 126 can act as a reference position for the graphic data point 124, which lies at the spacing e20 from this reference position. Conversely, the graphic data point 124 can act as a reference position for the data point 126, which lies at the spacing e20 from this reference position. In the event of a change in the inclination of the automobile, the positions of the graphic data point 124 and data point 126 in the sensor assembly 30 correspondingly change whereby the spacing e10 also correspondingly changes.

As seen in FIG. 7, the evaluation unit 40 receives an instantaneous signal concerning the spacing e10 of the graphic data point 124 and data point 126. The comparator 43 compares the instantaneous signal of the spacing e10 with the stored or supplied eO value and, if a difference e exists, the headlight adjustment control element 44 is directed to control the headlight position adjuster 18 to undertake appropriate adjustment of the headlights 10, 11 in order to reduce the e to zero.

The stored or supplied eO represents a correct adjustment of the projection limit L of the headlight 10. In this condition, the spacing e1 of the spot 24 and 26 on the road 14 is represented in the sensor assembly 30 as spacing e10=eO so that the e is zero and no adjustment via the headlight position adjuster 18 need be undertaken. If as a result of a change in the inclination of the automobile the actual position of the projection limit L varies from the correct position of the projection limit L, the spot 24 and 26 assume different spacings from the automobile than the spacing e1 which obtains in the correct position of the projection limit L. In this event, the spot 24 and 26 are represented in different positions in the sensor assembly 30 and a different spacing e10 between the graphic data point 124 and data point 126 exists than the spacing e10 which obtains in the correct position of the projection limit L. The comparator 43 then compares the instantaneous signal of the spacing e10 with the stored or supplied eO value and, upon detecting that a e exists, the headlight adjustment control element 44 is directed to control the headlight position adjuster 18 to undertake appropriate adjustment of the headlights 10, 11 in order to reduce the e to zero.

As shown in FIG. 3, the influence of the h in the height of the headlight 10 and the radiation emitters 20, 22 can be kept to a small degree since the spacing d1 of the spot 24, 26 from the automobile is chosen to be relatively large, for example, larger than about sensor assembly 30 meters and, in particular, larger than or equal to 40 meters. Moreover, it is preferably to configure the largest possible e3 between the radiation emitters 20, 22 on the automobile and the largest possible illumination width of the optic guide 31 of the sensor assembly 30 in order to achieve a relatively large precision of the regulation of the projection limit L. Additional reflected radiation sensor can also be provided through which the h of the height of the headlight 10 and the radiation emitters 20, 22 can be transmitted to the evaluation unit 40 and the evaluation unit 40 can then act to eliminate this influence. The additional reflected radiation sensor can be configured, for example, as ultrasound sensors. Through the use of additional sensors, the spacing d1 of the spot 24, 26 from the automobile can be selected to be less than 40 or 30 meters.

In FIG. 8, an automobile is shown having an additional embodiment of the headlight illumination field regulating apparatus of the present invention. The same or similar components of the headlight illumination field regulating apparatus are provided on this embodiment as have been described with respect to the one embodiment shown in FIG. 1 with several variations. Namely, the headlight illumination field regulating apparatus shown in FIG. 4 has only a single radiation emitter 20 which can be mounted, for example, in the headlight 10 which is on the right side of the automobile as viewed in the direction of travel 9 or in the vicinity thereof. The radiation emitter 20 radiates a radiation beam which irradiates the spot 24 on the road 14. The sensor assembly 30 is installed in the headlight 11 on the left side of the automobile as viewed in the direction of travel 9. The spot 24 is at a spacing d1 from the automobile and the spot 24 is represented in the sensor assembly 30 via the optic guide 31 as a graphic data point 124 in the matrix of the 32.

If an additional electromagnetic radiation emitter were to be installed in the headlight 11, a representative data point or plot of the additional sensed spot irradiated by this additional electromagnetic radiation emitter would be created in the sensor assembly 30 and this representative data point would assume different positions along the vertical axis OY of the matrix of the 32 in correspondence with the respective spacings of the represented irradiated spot from the automobile. However, this representative date point would always maintain the same distance from the vertical axis OY as viewed with respect to the axis OX. The additional spot can be arranged to lie on the vertical axis OY by undertaking corresponding disposition of the sensor assembly 30 such that its optical axis 33 lies in the plane in which the radiation beams of the additional electromagnetic radiation emitter travel. For this reason, the need for an additional electromagnetic radiation emitter in the headlight 11 can be eliminated as, instead, as seen in FIG. 8, the spacing e10 of the graphic data point 124 representing the spot 24 need only be evaluated with respect to the vertical axis OY. The reference position for the graphic data point 124 in the sensor assembly 30 is thus coincided with vertical axis OY. The spacing e10 is thus representative of the spacing e1 of the spot 24 on the road 14 from the intersecting line 35 representing the trace of the optical axis 33 of the sensor assembly 30 on the road 14. In dependence upon the spacing d1, the spot 24 is represented in the sensor assembly 30 is differing positions and the spacing e10 corresponding to these differing positions can be evaluated with respect to the vertical axis OY in the matrix of the 32.

The comparator 43 of the evaluation unit 40, as seen in FIG. 9, thus receives an instantaneous signal concerning the actual spacing e10 and this value is compared to the eO to create, if necessary, a e signal to be transmitted to the headlight adjustment control element 44, whereupon the headlight position adjuster 18 can be controlled by the headlight adjustment control element 44 to adjust the headlight 10 until the e value is reduced to zero. Also, the radiation emitter 20 and the sensor assembly 30 are preferably adjusted in conjunction with the adjustment of the headlight 10. It is also contemplated that the additional embodiment shown in FIG. 8 can be provided with a supplementary reflected radiation sensor to sense the changes h in the height of the headlight 10 and transmit a corresponding signal to the radiation emitters 20, 22, whereupon the headlight adjustment control element 44 can be provided with a signal to eliminate the influence of the h. The supplementary reflected radiation sensor can be, for example, an ultrasound sensor.

We claim:

1. An apparatus for regulating the illumination field of a running light of a vehicle, the running light for illuminating a region forward of the vehicle relative to the vehicle's direction of travel and the vehicle having an adjusting element for adjusting the orientation of the running light to thereby vary the position of the illumination field relative to the vehicle, comprising: a member for irradiating an area on the road surface with a radiation beam in a manner in which the radiation beam is reflected; a sensor for sensing a characteristic of radiation reflected from the irradiated area on the road surface; and a member for comparing a sensed reflected radiation characteristic with a radiation characteristic representative of a predetermined position of the illumination field of the running light, the comparing member being operatively connected with the adjusting element for providing a signal thereto in response to which the adjusting element can adjust the orientation of the running light on the vehicle and thereby reorient the running light into a position in which light projected therefrom illuminates a proper illumination field and the comparing member having means for creating a data point which is representative of the sensed reflected radiation characteristic and means for evaluating a characteristic of the data point with respect to a reference data point to determine the signal provided to the adjusting element and the reference data point is representative of the position of the sensor.

2. An apparatus according to claim 1 wherein the data point evaluating means is operable to plot the data point and the reference data point on a coordinate system and to evaluate the spacing of the data point from the reference data point.

3. An apparatus according to claim 2 wherein the comparing means is operable to compare the evaluated spacing of the data point from the reference data point with a predetermined desired spacing and to generate a signal to the adjusting means in response to the comparison.

4. An apparatus according to claim 3 wherein the sensor is operable to determine the deviation of a sensed reflected radiation characteristic from a reference location in the sensor which is represented by the reference data point in the comparing means and is operable to provide a signal to the comparing means having information concerning the deviation.

5. An apparatus according to claim 3 wherein the irradiating member is operable to irradiating a second area on the road surface with a second radiation beam, the sensor is operable to sense a reflected radiation characteristic of the radiation reflected from the second area of the road surface, and the comparing means is operable to classify the sensed characteristic of the second irradiated road surface area as the reference data point and to evaluate the deviation of the data point representing the sensed characteristic of the first-mentioned irradiated road surface area with respect to the reference data point.

6. An apparatus according to claim 5 wherein the irradiating member is operable to irradiate an area on the road surface as the second road surface area which is at generally the same spacing from the vehicle as the spacing of the first-mentioned irradiated road surface area.

7. An apparatus according to claim 5 wherein the irradiating member includes a first irradiating component for emitting the first-mentioned radiation beam and a second irradiating component for emitting the second radiation beam and the first-mentioned and second irradiating components are mounted on the vehicle in spaced relation to one another as viewed in a direction perpendicular to the direction of travel of the vehicle.

8. An apparatus according to claim 2 wherein the irradiating member is operable to irradiating a second area on the road surface with a second radiation beam, the sensor is operable to sense a reflected radiation characteristic of the radiation reflected from the second area of the road surface, and the comparing means is operable to plot a first data point representative of the first-mentioned sensed reflected radiation characteristic and a second data point representative of the second sensed reflected radiation characteristic and the reference data point on a coordinate system, to evaluate the respective spacings of the first data point and the second data point from the reference data point, to compare the evaluated spacings of the first and second data points from the reference data point with a predetermined desired spacings and to generate a signal to the adjusting means in response to the comparison.

9. An apparatus according to claim 8 wherein the sensor is operable to determine the deviation of a sensed reflected radiation characteristic from a reference location in the sensor which is represented by the reference data point in the comparing means and is operable to provide a signal to the comparing means having information concerning the deviation.

10. An apparatus according to claim 8 wherein the irradiating member is operable to irradiating a third and a fourth area on the road surface with respective radiation beams, the sensor is operable to sense a reflected radiation characteristic of the radiation reflected from the third and fourth areas of the road surface, and the comparing means is operable to plot a third data point representative of the third sensed reflected radiation characteristic and a fourth data point representative of the second sensed reflected radiation characteristic and the reference data point on a coordinate system, to evaluate the respective spacings of the third data point and the fourth data point from the reference data point, to compare the evaluated spacings of the third and fourth data points from the reference data point with a predetermined desired spacings and to generate a signal to the adjusting means in response to the comparison.

11. An apparatus according to claim 10 wherein the irradiating member is operable to irradiate areas on the road surface as the first and second road surface areas which are at generally the same spacing from the vehicle and to irradiate areas on the road surface as the third and fourth road surface areas which are at generally the same spacing from the vehicle.

12. An apparatus according to claim 10 wherein the irradiating member includes a first irradiating component for emitting the first radiation beam and a second irradiating component for emitting the second radiation beam and the first and second irradiating components are mounted on the vehicle in spaced relation to one another as viewed in a direction perpendicular to the direction of travel of the vehicle.

* * * * *